Figure 1:
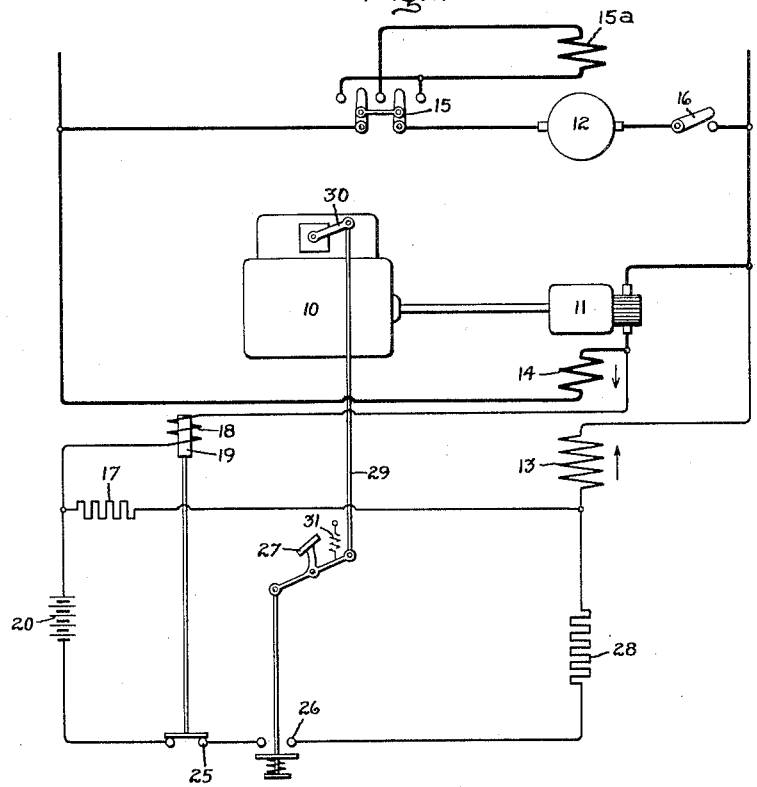

June 9, 1942.　　　　O. A. KEEP　　　　2,285,982
POWER SYSTEM
Filed Sept. 25, 1941　　　3 Sheets-Sheet 1

Inventor:
Otto A. Keep,
by Harry E. Dunham
His Attorney.

June 9, 1942.  O. A. KEEP  2,285,982
POWER SYSTEM
Filed Sept. 25, 1941   3 Sheets-Sheet 2

Inventor:
Otto A. Keep,
by Harry E. Dunham.
His Attorney.

June 9, 1942.          O. A. KEEP          2,285,982
POWER SYSTEM
Filed Sept. 25, 1941          3 Sheets-Sheet 3

Inventor:
Otto A. Keep,
by Harry E. Dunham
His Attorney.

Patented June 9, 1942

2,285,982

UNITED STATES PATENT OFFICE 2,285,982

POWER SYSTEM

Otto A. Keep, Harborcreek, Pa., assignor to General Electric Company, a corporation of New York Application September 25, 1941, Serial No. 412,290

17 Claims. (Cl. 290—17)

My invention relates to power systems and particularly to gas-electric or Diesel-electric power systems for self-propelled vehicles.

It is well known that the respective power output characteristics of an electric generator and an internal combustion engine differ widely when the machines are connected together and operated at a substantially constant speed. Over a large portion of the operating load range of a gas-electric or Diesel-electric power system the full speed power demand of the generator exceeds the available power output of the engine. Consequently, over this large portion of the operating range the engine is stalled somewhat, i. e., its speed decreased, by the excessive load applied by the generator until the load applied by the generator is decreased to a value equal to the available power output of the engine. Over the remaining portion of the generator operating range the available engine output is greater than the generator load demand and the engine speed is then ordinarily maintained at a predetermined value by a speed governor. The range of loads within which slight engine stalling takes place and within which the maximum power of the engine is utilized is referred to as the generator "wrap-around." While it is desirable to decrease the amount of engine stalling, any decrease in engine stalling is ordinarily accompanied by the disadvantage of a decrease in "wrap-around," i. e., decrease in the range within which the maximum available power output of the engine is utilized.

In an attempt to utilize the maximum available engine output over as wide a range as possible, numerous arrangements have heretofore been devised for controlling the generator excitation current to make the full speed generator demand conform more closely to the maximum available engine output. While most of these arrangements have produced the desired results more or less satisfactorily, they have not been readily accepted by the industry because of their considerable expense and because of their complication of the control system. From the commercial standpoint a successful field control system of this sort must involve a minimum of additional apparatus, both in order to minimize the expense and in order to decrease the dependence of the satisfactory operation upon numerous fine adjustments.

Accordingly, my invention has for one of its objects the provision of a simple, reliable and inexpensive system for controlling the shunt field of an engine-driven generator.

It is a further object of my invention to provide a gas-electric or Diesel-electric power system for a self-propelled vehicle in which maximum engine stalling or speed decrease is reduced without reducing the range of full utilization of the maximum engine output.

It is a still further object of my invention to provide a gas-electric or Diesel-electric power system for a self-propelled vehicle in which the range of utilization of maximum available engine output is increased without increasing the maximum engine stall.

It is a specific object of my invention to provide a gas-electric or Diesel-electric power system for a self-propelled vehicle with regulating means for increasing the generator shunt field excitation current for a limited period during starting of the vehicle, thereby to permit a generator excitation setting which results in closer approximation of the generator demand to the maximum available engine output over the normal operating range of the vehicle.

According to my invention, the maximum amount of engine stall is reduced by decreasing the generator excitation either by the interposition of additional resistance in series with the shunt field winding or by connecting the series field winding differentially instead of cumulatively. In order to prevent the decreased generator demand from reducing the range of full utilization of available engine output, a certain amount of supplementary shunt field excitation current is supplied at the low-voltage high-current end of the generator characteristic. My invention contemplates that this supplementary shunt field excitation current shall be controlled by a regulating device in such a manner as to maintain the total shunt field excitation within predetermined limits. If desired, the generator wrap-around may be increased at the high-voltage low-current end of the generator characteristic by providing a shunt field resistor having non-linear voltage-current characteristics.

By the term "regulating relay," I mean a device which is responsive to an electrical quantity such as current, voltage, or the like, or some combination thereof, and functions by intermittent opening and closing action to maintain such quantity substantially constant within predetermined narrow limits. Such a relay is ordinarily, though not necessarily, of the vibrating type because of the fact that the increased value of the quantity resulting from its operation in one direction is so great as to cause almost immediate reverse operation, and vice versa. A vibratory regulating relay is preferably but not necessarily provided with a stabilizing or regulating coil whose energization is dependent upon the position of the relay, thereby to enhance the vibratory action.

Figure 2:
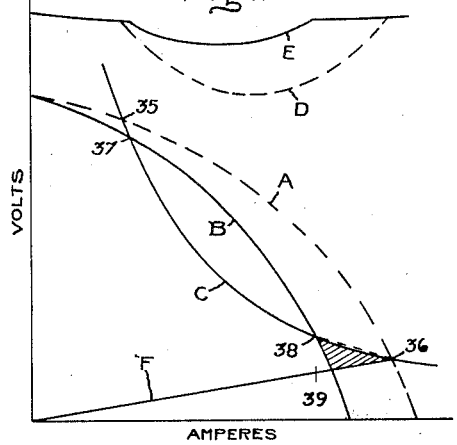
Figure 3:
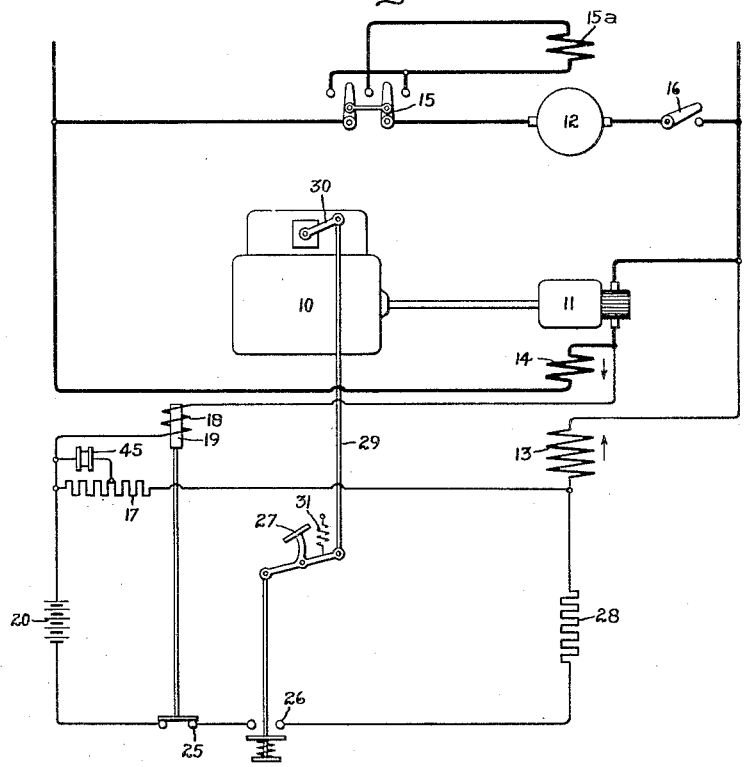
Figure 4:
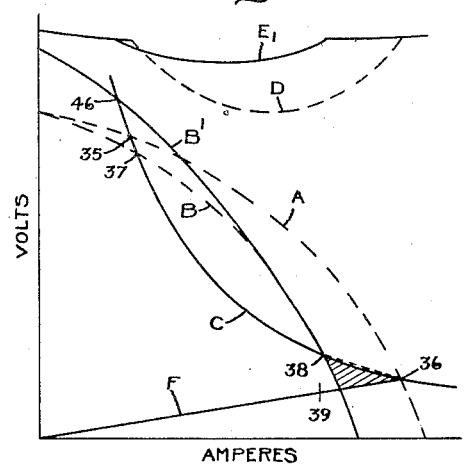
Figure 5:
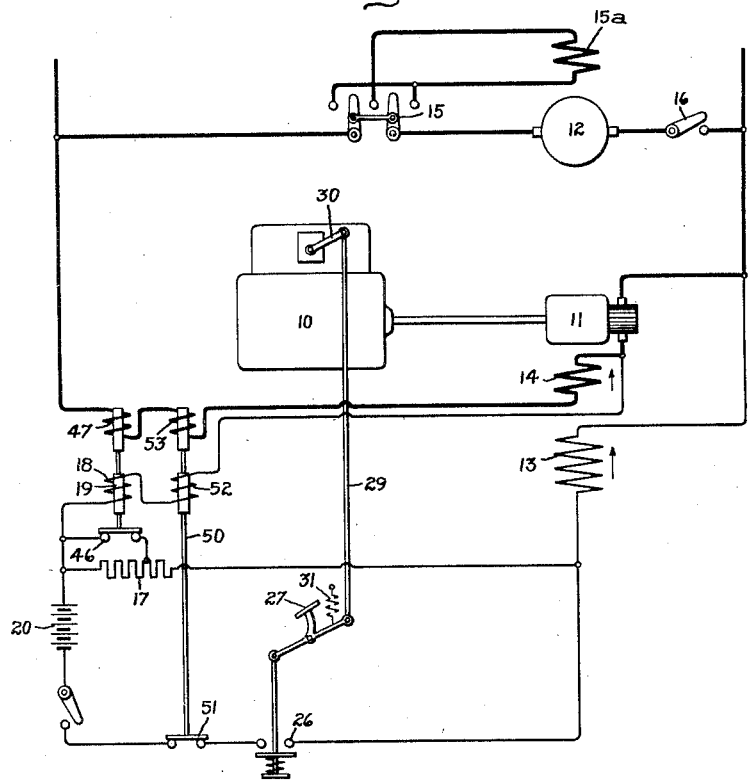
Figure 6:
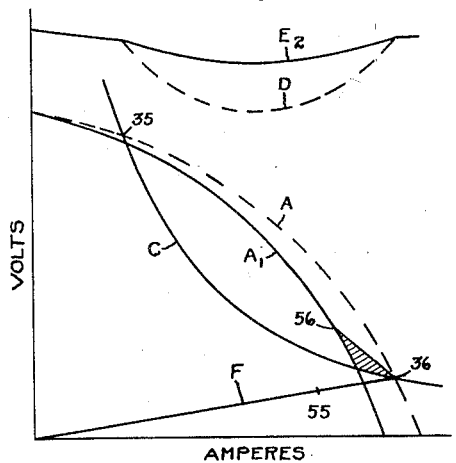

For a more complete understanding of my invention and a further appreciation of its objects and advantages reference should now be had to the following detailed specification taken in conjunction with the accompanying drawings in which Fig. 1 is a simplified diagrammatic representation of a power system embodying my invention in one form; Fig. 2 is a group of engine and generator characteristic curves graphically illustrating certain operating characteristics of the system shown in Fig. 1. Fig. 3 is a simplified diagram of a power system similar to that shown at Fig. 1 and having certain additional means forming part of my invention; Fig. 4 is a group of engine and generator characteristic curves graphically representing certain operating characteristics of the power system shown at Fig. 3; Fig. 5 is a simplified diagram of a power system embodying my invention in a modified form; and Fig. 6 is a group of engine and generator characteristic curves graphically representing certain operating characteristics of the power system shown at Fig. 5. In all the drawings corresponding parts or elements have been assigned like reference numerals.

Referring now to the drawings, and particularly to Fig. 1, I have shown an internal combustion engine 10 connected to drive a direct current generator 11 which supplies current to a load circuit including a reversible traction motor 12. The generator 11 is provided with a shunt field winding 13 and a series field winding 14 and is connected to the traction motor 12 through a reversing switch 15, a motor series field winding 15a, and a line contactor 16. The shunt field winding 13 of the generator 11 is connected across the terminals of the generator in series with a fixed shunt field resistor 17 and an operating coil 18 of a control relay 19 of the regulating type. A generator shunt field teasing circuit is connected across the terminals of the shunt field resistor 17 and comprises a local source of control voltage such as a battery 20, a pair of normally closed contacts 25 of the regulating control relay 19, a pair of normally open interlock contacts 26 operatively connected to an engine accelerating pedal 27, and a resistor 28. The accelerating pedal 27 is connected by a link 29 to an engine throttle control lever 30. The throttle control lever 30 and the accelerating pedal 27 are biased to the idling position, as shown, by means of a tension spring 31. In this position of the accelerating pedal the interlock contact 26 is open, the pedal being so arranged that as soon as it is moved from the idling position, the interlock contact 26 is closed and remains closed until the accelerating pedal is returned to its idling position.

In gas-electric or Diesel-electric vehicle drive systems heretofore known about one-sixth turn of cumulative series field winding has usually been utilized on the generator. As described in Patent 2,215,993 issued to John C. Aydelott on September 24, 1940, such systems have been provided with teaser excitation for the generator shunt field, a simple snap-acting relay being used to maintain the teaser circuit closed only until the generator current attains its full load value in the initial build-up of generator voltage. The effect of such teasing excitation will become more evident hereinafter in connection with the curves of Fig. 2.

According to my invention, the generator shunt field teasing circuit is controlled by the regulating control relay 19 in such a manner as to considerably reduce maximum stall of the internal combustion engine without narrowing the range of full utilization of maximum available engine power. According to the modification of Fig. 1 this is accomplished by connecting the generator series field winding 14 differentially with respect to the generator shunt field winding 13 and by utilizing a control relay 19 of the regulating type responsive to the current in the generator shunt field winding 13 to control a certain amount of supplementary shunt field excitation supplied by the battery 20 after the generator current has attained its full load value. The regulating relay 19 is so adjusted that when the vehicle is accelerating from standstill the relay does not open its contacts to disable the teasing circuit as soon as the generator load current first attains its normal full load value, but permits the battery 20 to continue to supply supplementary excitation to the generator shunt field winding during an additional substantial portion of the starting period during which the generator load current increases to a still greater value and then decreases to a normal value upon an increase in generator voltage. Furthermore, the relay 19 is very sensitive to slight changes in energization, so that it operates by intermittent opening and closing of its contacts to maintain the generator shunt field current substantially constant within predetermined narrow limits until such time as the load on the generator is so reduced that its voltage and hence its shunt field current continuously exceeds the current setting of the relay and maintains the relay open.

The operation of my invention in the form illustrated in Fig. 1 may best be understood by referring now to Fig. 2. In Fig. 2 the broken line curve A is the volt-ampere characteristic of a typical direct current generator having the one-sixth turn of cumulative series field usually used in connection with an engine-driven generator, while the curve B is the volt-ampere characteristic of the generator 11 of similar construction and size but provided with one-half turn differential series field in place of the cumulative series field. The curve C is a constant horsepower curve representing the maximum available output of the internal combustion engine 10. It will be observed that the curve C would intersect the curve A at the points 35 and 36, so that for operation between these two points the maximum available output of the engine would be insufficient to supply the demands of the generator. Consequently, the generator output would be reduced by slight engine stalling within this range between the points 35 and 36. This stalling is indicated by the broken line speed curve D which shows that between the points 35 and 36 the engine speed is reduced, while on either side of these points the engine speed remains substantially constant under the control of a constant speed governor (not shown).

According to the present invention as illustrated at Fig. 1, the generator 11 is operated upon a volt-ampere characteristic curve B, Fig. 2 which intersects the engine characteristic C at points 37 and 38. The engine speed characteristic under this condition is shown by the curve E, and it will be observed that the maximum amount of engine stalling is considerably reduced. In order to prevent a corresponding decrease in generator wrap-around, the excitation of the shunt field winding 13 of the generator is boosted from the battery 20 through the regulating control relay 19, the relay 19 being so calibrated that the supplementary excitation is supplied by the battery only while the generator is operating on the high current portion of its characteristic curve.

In starting the vehicle from standstill the switch 16 is first closed and the pedal 27 is then depressed to bring the engine 10 up to speed and to add teaser excitation to the generator shunt field winding 13 from the battery 20. The excitation added by the battery 20 is indicated by the straight line F, which represents the curve along which the generator voltage builds up when supplied with teaser excitation from the battery. Ordinarily, in systems heretofore used the teaser excitation is suddenly cut off at a point 39 when the generator current first reaches substantially its full load value, at which time, substantially, the motor 12 starts the vehicle. In the system of the Aydelott patent mentioned hereinbefore the switch 22 opens the teaser circuit at such a point. In order to increase the wrap-around of the generator in accordance with my invention the regulating relay 19 is so calibrated that it maintains its contact 25 closed until the generator voltage reaches the point 36. Therefore, the distance 39—36 represents the amount of excitation added by the battery over and above the customary teaser excitation. Also the regulating relay 19 is made very sensitive to changes in excitation and is so calibrated in response to the current in the shunt field winding 13 that it opens its contacts 25 when the generator voltage reaches the point 36. The resulting momentary decrease in generator voltage and current will almost immediately cause the relay 19 to drop out. Thus, the relay will regulate on its contacts to maintain the total shunt field excitation current substantially constant. Since the current in the differential series field winding 14 is simultaneously decreasing because of increasing motor speed and back E. M. F., the resultant generator field excitation increases slightly so that the generator voltage will build up along a substantially straight line 36—38. The line 36—38 follows very closely the engine characteristic in this region. Due to the fact that the resulting generator demand in the region between the points 36 and 38 is substantially equal to the available engine power the engine speed curve E indicates substantially no stalling of the engine in this region.

It will now be apparent that by means of a single simple regulating relay 19 I have produced a generator characteristic which, starting at no load, follows the curve B to the point 38 and then proceeds along the line 38—36, thereby utilizing the maximum available engine output over the entire range between the points 37 and 36 and at the same time considerably reducing the maximum amount of stall of the engine.

Referring now to Fig. 3, I have illustrated an additional feature of my invention which may be utilized in connection with the regulating arrangement of Fig. 1 to further increase the generator wrap-around without increasing the maximum engine stall. In Fig. 3 I have shown a negative resistance-current characteristic resistor 45 shunting a portion of the shunt field resistor 17. In all other respects Fig. 2 is the same as Fig. 1 and like reference numerals have been assigned to corresponding parts.

By negative resistance-current characteristic resistor I mean a resistor whose ohmic value decreases with increases in current therethrough or voltage thereacross. Many such resistance devices are known in the art. For example, there are resistance devices of this character which operate through temperature changes, thus certain forms of carbon and boron have negative temperature coefficients of resistance, and increases in current through these elements raise their temperature and thus cause a reduction in their electrical resistance. While my invention is not limited to any particular type of negative resistance-current characteristic resistor, I prefer at present to use the special ceramic resistance material which is disclosed and claimed in Patent 1,822,742, granted September 8, 1931 on an application of Karl B. McEachron. This material has the property of substantially instantaneously reducing its electrical resistance with increases in current through it or voltage across it, and its resistance is substantially independent of its temperature.

Having in mind the above-described characteristic of the resistor 45, it will be evident that, as the generator voltage and hence the generator shunt field excitation current increases, the shunt circuit through the resistor 45 will decrease in resistance due to the increased voltage across the resistor. Consequently, the total resistance in series with the generator shunt field winding will automatically decrease as the generator voltage increases.

Referring now to Fig. 4, the effect of the negative resistance-current resistor 45 will be evident. Due to the non-linearly increasing shunt field excitation current at the higher generator voltages the generator volt-ampere characteristic follows a curve $B_1$ instead of the simple differentially compound voltage characteristic B. The curve B is the same as the curve B of Fig. 2. For the purpose of comparison, the curves A, C and D and the points 35 to 39, inclusive, have been drawn to correspond to the similar parts of Fig. 2. The particular advantage of the resistor 45 appears from the fact that the generator characteristic curve $B_1$ now intersects the engine characteristic curve C at a point 46 so located with respect to the point 36 that the generator wrap-around is increased by the distance between the points 37 and 46. In Fig. 4 the engine speed characteristic is shown by the curve $E_1$, which is similar to the curve E of Fig. 2 in that the maximum amount of engine stalling is approximately the same but differs from the curve E in that the generator wrap around is increased by the distance between points 37 and 46 by the raising of the point of maximum utilization of available engine output (point 46).

Referring now to Fig. 5, I have illustrated a modified form of my invention in which the generator is provided with the customary one-sixth turn of cumulative series field and the battery circuit is used for teasing purposes only, as in the Aydelott patent referred to. In this embodiment decreased maximum engine stalling is attained by regulatory control of the generator shunt field resistor.

The general circuit arrangement of Fig. 5 is similar to that of Figs. 1 and 3, corresponding parts having been assigned like reference numerals. As indicated upon the drawings, however, the generator series field winding 14 is connected cumulatively with respect to the generator shunt field winding 13. Furthermore, the regulating control relay 19 has no contact in the battery teasing circuit but is provided with a normally closed contact 46 connected in shunt relation with a portion of the generator shunt field resistor 17. The regulating relay 19 in Fig. 5 also differs from that in Figs. 1 and 3 in that it is jointly energized by a current coil 47 connected in series circuit relation with the motor 12 and the coil 18 carrying the generator shunt field excitation current. In addition to the regulating control relay 19 the arrangement of Fig. 5 is provided with a snap-acting teasing relay 50 having a normally closed contact 51 in the battery circuit and a pair of operating coils 52 and 53 connected in the same manner as the coils 18 and 47, respectively, to which it is jointly responsive.

The manner in which the arrangement of Fig. 5 may be operated to reduce the maximum engine stall without reducing the generator wrap-around may be observed by referring now to Fig. 6. In Fig. 6 the curve A is the same as the curve A on Figs. 2 and 4 and represents the volt-ampere characteristic of a generator provided with the one-sixth turn of cumulative series field and the customary amount of shunt field resistance. The curve C represents the engine output characteristic, and the curve D represents the engine speed characteristic, these curves being the same as shown at Figs. 2 and 4. In order to reduce the maximum amount of engine stalling the generator excitation current and hence the volt-ampere characteristic may be lowered, as represented by the curve $A_1$, by the use of a relatively large shunt field resistor 17. To prevent a corresponding decrease in generator wrap-around, a shunt around a portion of the field resistor 17 is controlled by the contact 46 of the regulating relay 19. As indicated in Fig. 6 this control takes place at the high current portion of the generator characteristic and after the generator shunt field teasing relay 50 has opened its contact 51. The curve F of Fig. 6 represents the line along which the generator voltage builds up under the impetus of the added battery excitation through the teasing relay 50. The relay 50, however, is so adjusted that it opens its contact 51 at a point 55 when the generator current reaches substantially its full load value. The adjustment of the regulating relay 19, however, is such that its contact 46 remains closed until the generator voltage has built up to a point 36. Therefore, between the points 55 and 36 the generator shunt field excitation is increased by the indicated amount due to the fact that the regulating relay 19 shunts a portion of the generator shunt field resistor. As previously mentioned the relay 19 is of the regulating type and operates to maintain substantially constant the value of the condition to which it is responsive. Since in the modification shown at Fig. 5 the relay 19 is jointly responsive to the generator armature current and the generator shunt field excitation current, it will regulate along a line 36—56 until at the point 56 the joint effect of the generator field and armature current is sufficient to maintain the regulating relay 19 permanently energized. This regulation will take place in the manner described above with reference to Figs. 1 and 2 except that the relay of Fig. 5 demonstrates a joint response. Thus, the effective generator volt-ampere characteristic follows the curve $A_1$ to a point 56 and then follows the line 56—36, so that the generator "wrap-around" is still represented by the distance between the points 35 and 36, while the maximum amount of engine stall has been considerably reduced, as indicated by the engine speed characteristic curve $E_2$ plotted for the generator volt-ampere characteristic $A_1$—56—36.

It will be readily understood, of course, that if desired, the negative resistance-current resistor shown at Fig. 3 may be used in the circuit arrangement of Fig. 5 as well as in that of Fig. 1. In case of such use the effect of the resistor will be to raise the volt-ampere characteristic and increase the generator wrap-around in the high voltage range, as graphically illustrated at Fig. 4.

It will be now evident that I have provided a simple, reliable and inexpensive system of control for a gas-electric or Diesel-electric vehicle power system which differs structurally from known arrangements merely by the addition of a single inexpensive regulating relay, but produces distinctly improved results by its new and novel mode of operation. According to my invention the maximum amount of engine stalling is reduced by lowering the generator volt-ampere characteristic and then supplying additional generator shunt field excitation under the control of the regulating relay for a short interval while vehicle is accelerating from standstill, thereby to prevent a reduction of the range within which the maximum available power output of the engine is utilized. According to one form of my invention the additional regulated shunt field excitation current is supplied by a control battery connected through the existing teaser circuit, while according to another modification of my invention the additional excitation is supplied by controlling the generator shunt field resistor. Furthermore, the generator wrap-around may be increased at the high-voltage low-current end of the characteristic by automatic non-linear control of a generator shunt field resistor shunt.

While I have shown certain representative embodiments of my invention for purpose of illustration, many other modifications will occur to those skilled in the art, and I therefore wish to have it understood that I do not wish to be limited to the illustrated embodiments, but that I intend by the appended claims to cover all such modifications as fall within the true spirit and scope of my invention.

What I claim as new and desire to secure by Letters Patent of the United States, is:

1. In a power system comprising an internal combustion engine connected to a direct current generator which is arranged to supply current to an electric motor, the inherent power demand of said generator being greater than the maximum available power output of said engine over a substantial range of generator load operation but less than the maximum available power output of said engine beyond said range, means for abnormally increasing the excitation of said generator beyond said range of load operation thereby to increase the power demand of said generator to equal the maximum available power output of said engine, and regulating means for controlling said last named means at least until the inherent generator power demand falls within said range.

2. In a power system comprising an internal combustion engine connected to drive a self-excited direct-current generator which is arranged to supply current to an electric motor, the inherent power demand of said generator being greater than the maximum available power output of said engine over a substantial range of generator load operation, excitation increasing means for abnormally increasing the excitation of said generator at a point beyond said range of load operation thereby to increase the power demand of said generator to equal the maximum available power output of said engine, and regulating means for controlling said excitation increasing means in such a manner as to maintain the power demand of said generator equal to the maximum available power output of said engine until the inherent power demand of said generator falls within said range, said regulating means being operative thereafter to disable said excitation increasing means.

3. In a power system for a self-propelled electric vehicle, an electric motor for driving said vehicle, a self-excited direct-current generator for supplying current to said motor, said generator having a normal volt-ampere characteristic, an internal combustion engine connected to drive said generator, separate excitation means for said generator, means for connecting said separate excitation means to said generator to enable the current of said generator to build up substantially to its full-load value to start said vehicle, regulating means for further abnormally increasing the excitation of said generator to permit the current and voltage of said generator to build up beyond said normal volt-ampere characteristic until the power demand of said generator is equal to the maximum available power output of said engine, said regulating means being responsive to an excitation current of said generator to maintain said excitation current within predetermined limits until the inherent self-excited power demand of said generator becomes greater than the maximum available power output of said engine.

4. In a power system for a self-propelled electric vehicle, an electric motor for driving said vehicle, a self-excited direct-current generator for supplying current to said motor, said generator having a normal volt-ampere characteristic, an internal combustion engine connected to drive said generator, separate excitation means for said generator, means for connecting said separate excitation means to said generator to enable the current of said generator to build up substantially to its full-load value to start said vehicle, regulating means for further abnormally increasing the excitation of said generator to permit the current and voltage of said generator to build up beyond said normal volt-ampere characteristic until the power demand of said generator is substantially equal to the maximum available power output of said engine, said regulating means being responsive to an excitation current of said generator to maintain the power demand of said generator substantially equal to the maximum available power output of said engine until the inherent self-excited power demand of said generator becomes greater than the maximum available power output of said engine.

5. In a power system for a self-propelled electric vehicle, an electric motor for driving said vehicle, a self-excited, direct-current generator for supplying current to said motor, said generator having a normal volt-ampere characteristic, an internal combustion engine connected to drive said generator, throttle control means for said engine, separate excitation means for said generator, means operative in conjunction with said throttle control means for connecting said separate excitation means to said generator to enable the current of said generator to build up substantially to its full-load value to start said vehicle, regulating means for further abnormally increasing the excitation of said generator to permit the current and voltage of said generator to build up beyond said normal volt-ampere characteristic until the power demand of said generator is substantially equal to the maximum available power output of said engine, said regulating means being responsive to an excitation current of said generator to maintain the power demand of said generator substantially equal to the maximum available power output of said engine until the inherent self-excited power demand of said generator becomes greater than the maximum available power output of said engine and thereafter to reduce said excitation current to its normal self-excited value.

6. In a power system for a self-propelled electric vehicle, an electric motor for driving said vehicle, a direct current generator for supplying current to said motor, said generator having a shunt field winding, an internal combustion engine for driving said generator, said shunt field winding being connected to conduct an excitation current the magnitude of which is primarily dependent upon the voltage of said generator, auxiliary means for increasing said excitation current, and regulating means responsive to said excitation current for maintaining said current within predetermined limits until said voltage attains a predetermined value, said regulating means disabling said auxiliary means when said voltage exceeds said predetermined value.

7. In a power system for a self-propelled electric vehicle, an electric motor for driving said vehicle, a direct current generator for supplying current to said motor, said generator having a shunt field winding, a substantially constant horse power internal combustion engine for driving said generator, a fixed resistor connected in series circuit relation with said shunt field winding thereby normally to determine the excitation current supplied to said shunt field winding for any predetermined voltage of said generator and to determine a volt-ampere characteristic for said generator such that the power demand of said generator will be at least as great as the maximum available power output of said engine over a predetermined range of operation of said system, auxiliary means for increasing said excitation current beyond that determined by said resistor thereby to increase said range of operation, and regulating means responsive to said excitation current for maintaining said current within predetermined limits until said generator voltage attains a predetermined value, said regulating means disabling said auxiliary means when said generator voltage exceeds said predetermined value.

8. In a power system for a self-propelled electric vehicle, an electric motor for driving said vehicle, a direct current generator for supplying current to said motor, said generator having a shunt field winding, a substantially constant horsepower internal combustion engine for driving said generator, a resistor connected in series circuit relation with said shunt field winding, said shunt field winding carrying an excitation current the magnitude of which is primarily dependent upon the voltage of said generator, a negative resistance-current characteristic resistor connected to shunt a fixed portion of said resistor, auxiliary means for increasing the excitation current of said shunt field winding, and vibratory regulating means responsive to said excitation current for maintaining said current within predetermined limits until said voltage of said generator attains a predetermined value, said regulating means disabling said auxiliary means when said voltage exceeds said predetermined value.

9. In a power system for a self-propelled electric vehicle, an electric motor for driving said vehicle, a direct current generator for supplying current to said motor, said generator having a shunt field winding, a substantially constant horsepower internal combustion engine for driving said generator, a fixed resistor connected in series circuit relation with said shunt field winding thereby normally to determine the excitation of said shunt field winding for any predetermined voltage of said generator and to determine a volt-ampere characteristic curve for said generator such that the power demand of said generator will be at least equal to the maximum available power output of said engine over a predetermined range of operation of said system, and a negative resistance-current characteristic resistor connected in shunt circuit relation with a portion of said fixed resistor thereby to increase said range.

10. In a power system for a self-propelled electric vehicle, an electric motor for driving said vehicle, a direct current generator for supplying current to said motor, said generator having a shunt field winding, an internal combustion engine for driving said generator, a source of direct current supply, a normally closed control switch for connecting said source of supply in circuit with said shunt field winding thereby to supply excitation current to said winding, and a regulating coil for controlling said switch in response to the current flowing through said shunt field winding, said coil being operative to actuate said switch to maintain said current substantially constant over a predetermined range of low speed operation of said vehicle and to disconnect said source of supply from said shunt field winding when the voltage of said generator exceeds a predetermined value.

11. In a power system for a self-propelled electric vehicle, an electric motor for driving said vehicle, a direct current generator for supplying current to said motor, said generator having a shunt field winding, an internal combustion engine for driving said generator, a resistor connected in series circuit relation with said shunt field winding, a source of direct current supply, a manually-operable switch for connecting said source of direct current supply in a circuit including said resistor and said shunt field winding thereby to supply teaser excitation to said winding, a normally closed switch for disabling said circuit, and a regulating coil responsive to the current flowing in said shunt field winding for intermittently actuating said normally closed switch to maintain said current substantially constant over a predetermined range of low speed operation of said vehicle, said regulating coil actuating said normally closed switch to maintain said circuit disabled when the voltage of said generator exceeds a predetermined value.

12. In a power system for a self-propelled electric vehicle, an electric motor for driving said vehicle, a direct current generator for supplying current to said motor, said generator having a shunt field winding, a substantially constant horsepower internal combustion engine for driving said generator, said combustion engine being provided with a manually-operable throttle control lever, a battery, a normally open interlock switch connected to said manually operable throttle control lever and arranged to complete a teaser circuit including said battery and said shunt field winding thereby to assist said generator in building up voltage to energize said motor and start said vehicle, and a regulating relay responsive to the current flowing through said shunt field winding and having normally closed contacts in said teaser circuit, said relay being operable intermittently to close said teaser circuit after the voltage of said generator has built up to a self-sustaining value thereby to maintain the current in said shunt field winding substantially constant over a predetermined range of low speed operation of said vehicle and being operable to maintain said teaser circuit disabled after said voltage of said generator exceeds a predetermined value higher than said self-sustaining value.

13. In a power system for a self-propelled electric vehicle, an electric motor for driving said vehicle, a direct current generator for supplying current to said motor, said generator having a shunt field winding, a substantially constant horsepower internal combustion engine for driving said generator, said combustion engine being provided with a manually-operable throttle control lever, a fixed resistor connected in series circuit relation with said shunt field winding thereby normally to determine the excitation current supplied said shunt field winding for any predetermined voltage of said generator and to determine a volt-ampere characteristic for said generator such that the power demand of said generator will exceed the maximum available power output of said engine over a predetermined range of operation, a negative resistance-current characteristic resistor connected to shunt a portion of said fixed resistor, a battery, a normally open interlock switch operatively connected to said manually-operable control lever and arranged to complete a teaser circuit including said battery and said shunt field winding, and a regulating relay having a normally closed contact in said teaser circuit for intermittently maintaining said circuit effective after the voltage of said generator has built up to a self-sustaining value thereby to supply additional excitation current to said shunt field winding to increase said range, said regulating relay being responsive to said excitation current and being sufficiently sensitive to maintain said excitation current substantially constant until the voltage of said generator attains a predetermined value and to maintain said teaser circuit disabled after said voltage exceeds said predetermined value.

14. In a power system for a self-propelled electric vehicle, an electric motor for driving said vehicle, a direct current generator for supplying current to said motor, said generator having a shunt field winding arranged to carry an excitation current, an internal combustion engine for driving said generator, a resistor connected in series circuit relation with said shunt field winding, and regulating means responsive to said excitation current for controlling said resistor to maintain said excitation current within predetermined limits over a predetermined range of low speed operation of said vehicle, said regulating means being ineffective to control the resistance of said resistor after the voltage of said generator has attained a predetermined value.

15. In a power system for a self-propelled electric vehicle, an electric motor for driving said vehicle, a direct current generator for supplying current to said motor, said generator having a shunt field winding arranged to carry an excitation current, an internal combustion engine for driving said generator, a resistor connected in series circuit relation with said shunt field winding, and a regulating relay jointly responsive to the current supplied to said motor and to said excitation current for regulating the resistance of said resistor to maintain said excitation current within predetermined limits over a predetermined range of low speed operation of said vehicle, said regulating relay being ineffective to control the resistance of said resistor after the voltage of said generator has attained a predetermined value.

16. In a power system for a self-propelled electric vehicle, an electric motor for driving said vehicle, a direct current generator for supplying current to said motor, said generator having a shunt field winding arranged to carry an excitation current, an internal combustion engine for driving said generator, a fixed resistor connected in series circuit relation with said shunt field winding, a source of direct current supply, a manually-operable switch for completing a teaser circuit including said source of supply and said shunt field winding, a snap-acting relay having a pair of normally closed contacts in said teaser circuit and having an actuating coil operable to disable said teaser circuit when the voltage of said generator has attained a first predetermined value, means for shunting a portion of said fixed resistor, and a regulating relay jointly responsive to the current passing through said motor and to said excitation current for controlling said shunting means to maintain said excitation current within predetermined limits until the voltage of said generator attains a second and higher predetermined value, said regulating relay disabling said shunting means when the voltage of said generator exceeds said second predetermined value.

17. In a power system for a self-propelled electric vehicle, an electric motor for driving said vehicle, a direct current generator for supplying current to said motor, said generator having a shunt field winding arranged to carry an excitation current, an internal combustion engine for driving said generator, a fixed resistor connected in series circuit relation with said shunt field winding, a battery, normally open switching means operable in conjunction with said throttle control lever to complete a teaser circuit including said battery and said shunt field winding, a snap-acting relay having normally closed contacts in said teaser circuit and provided with a pair of actuating coils responsive respectively to the current supplied to said motor and to said excitation current thereby to disable said teaser circuit when the voltage of said generator attains a first predetermined value, a negative resistance-current characteristic resistor shunting a portion of said fixed resistor, second shunting means connected in parallel circuit relation with a portion of said fixed resistor, and a regulating relay having a pair of actuating coils responsive respectively to the current supplied to said motor and to said excitation current and having a pair of normally closed contacts arranged to control said second shunting means thereby to maintain said excitation current in said shunt field winding within predetermined limits until the voltage of said generator attains a second and higher predetermined value, said regulating relay maintaining said second shunting means ineffective when the voltage of said generator exceeds said second predetermined value.

OTTO A. KEEP.